Figure 2:
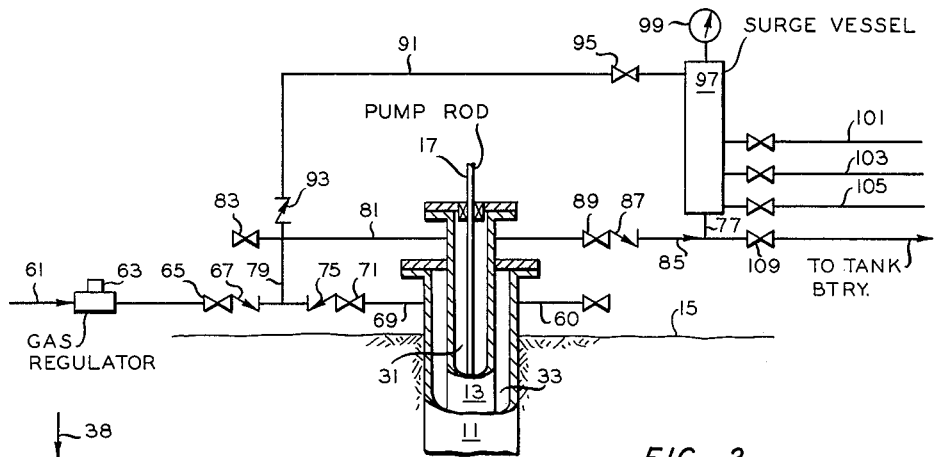

Aug. 3, 1965 R. W. ELLIOTT 3,198,133
PROCESS AND APPARATUS FOR REDUCING SURGE IN LEAD LINES
Filed July 8, 1963

INVENTOR.
R. W. ELLIOTT
BY *Young & Quigg*
ATTORNEYS

United States Patent Office 3,198,133
Patented Aug. 3, 1965

3,198,133
PROCESS AND APPARATUS FOR REDUCING SURGE IN LEAD LINES
Ralph W. Elliott, Bartlesville, Okla., assignor to Phillips Petroleum Company, a corporation of Delaware
Filed July 8, 1963, Ser. No. 293,520
16 Claims. (Cl. 103—223)

This application is a continuation-in-part of S.N. 62,709 filed October 14, 1960.

This invention relates to a pressure surge absorbing process and apparatus. In one aspect, it relates to improvements in a process and apparatus for absorbing pressure surges in discharge conduits from single acting reciprocating pumps. In another aspect, it relates to a pressure surge absorbing process and apparatus for flow lines transporting liquid from oil wells employing single acting reciprocating pumps.

An object of this invention is to provide a pressure surge absorbing process and apparatus free from expansible members. Another object of this invention is to provide a pressure surge absorbing apparatus which is relatively inexpensive, easy to manufacture and to install and which has a minimum of moving parts. A further object is to provide a simple and economical method of reducing pressure surges in the lead line from a well using a single action reciprocating pump. Still another object of this invention is to provide such a pressure surge absorbing apparatus for use in conjunction with oil well flow lines into which single acting reciprocating pumps discharge well liquid. Other objects of the invention will become apparent upon consideration of the accompanying disclosure.

As is realized in the oil production art, oil transmitting pipe in many installations comprises the major portion of apparatus cost especially when the pipe is long. When oil is pumped at relatively high pressures, conventional thick wall pipe is ordinarily used. Obviously, such pipe is quite costly. When oil is free from corrosive materials, such as oxygen, hydrogen sulfide or water containing acidulous materials, corrosion within the pipe is relatively small. However, when transporting oils containing hydrogen sulfide and water containing hydrogen sulfide and water containing acid or acid forming salts, interior corrosion may cause frequent pipe replacements to be made. One means of reducing interior corrosion on such pipes is to line the pipes with cement. In many instances, in which a cement lining is used in pipes, thin wall piping can be used, particularly in case the oil is under relatively low pressure. When thin walled cement lined pipe is used for transmitting oils from wells employing beam pumping equipment, especially when the lead lines are long, such beam pumping equipment causes quite wide pressure surges in the oil entering the lead lines. When employing thin wall pipe, wide pressure surges tend to expand the pipe thereby causing the cement lining to crack. Even though the cracks may be hair-like in type, corrosive oil or corrosive water can enter the cracks and contact the pipe thereby causing corrosion. When the pressure surge variation is quite large, oil and/or water enters these cracks to contact the inner wall of the pipe, then, upon reduction of the pressure, some of the oil and/or water may be expelled from the cracks in the cement lining. Thus, in this manner, fresh corrosive oil and/or water enters these cracks upon each high pressure impulse of the liquid contents of the pipe. In this manner corrosion of the inner wall of the thin wall pipe is more rapid than would otherwise be in the absence of such cracks. Thus, another object of this invention is to provide pressure surge absorbing apparatus for use in cement lined, thin wall pipes so that corrosive oil and/or water will not continuously contact the inner wall of the pipe through the cracks in the cement lining.

Surge vessels or chambers for use in such cases are known but as far as I am aware, the prior art surge chambers employ bladders or other expansible material to absorb or assist in absorbing the pressure surges.

When using a 2½ inch pump at 18½ strokes per minute with 108 inch stroke discharging oil into a 3-inch diameter lead line which is 3,000 feet long, the normal lead line pressure at the well surges from a slight vacuum to about 250 pounds per square inch gauge (p.s.i.g.). When pressures within a pipe vary from, for example, atmospheric or approximately atmospheric, to 250 pounds p.s.i.g., it is realized that some expansion in the diameter of the pipe will take place unless the pipe is thick walled. Under the well conditions just mentioned, the static lead line pressure is about 45 p.s.i.g.

When using the pressure absorbing apparatus of this invention, maximum lead line pressures were reduced from the above-mentioned 250 p.s.i.g. to 60 p.s.i.g. as a maximum and to 45 to 55 p.s.i.g. as a minimum.

Many advantages of this invention will be realized by those skilled in the art upon reading the following description which, taken with the attached drawing, forms a part of this specification.

Figure 1:
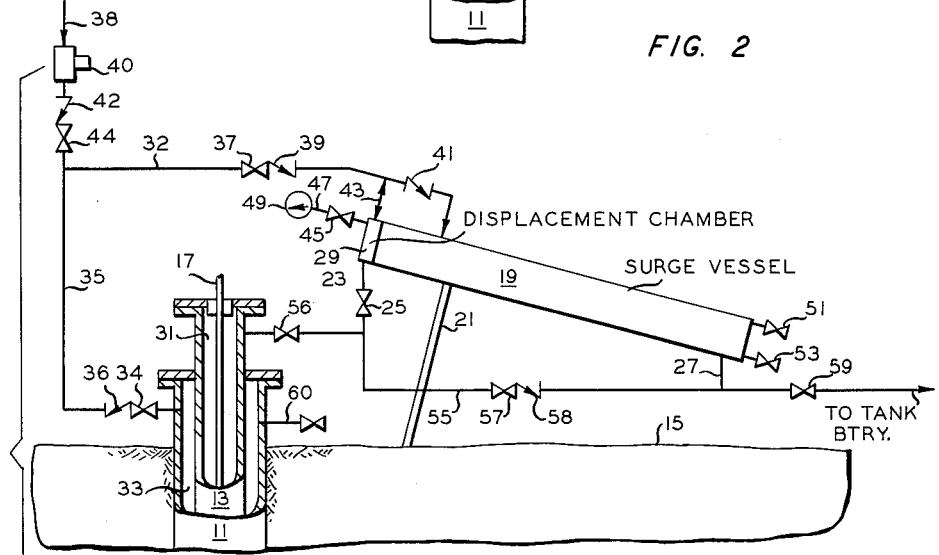
Figure 1:
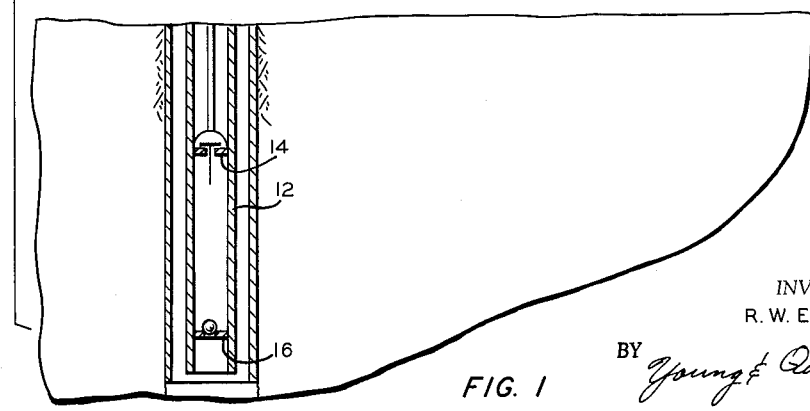

In the drawing, FIGURE 1 illustrates an arrangement of apparatus parts suitable to accomplish the objects of this invention. FIGURE 2 illustrates in diagrammatic form another arrangement of apparatus parts suitable for carrying out the objects of this invention.

In FIGURE 1 of the drawing, reference numeral 11 identifies a well casing running from the ground level 15 down into the well. The production tubing 13 is provided within casing 11 with a diameter sufficiently less than that of the casing to provide an annular space 33. Within the production tubing, as illustrated in FIGURE 1, a pump rod 17 which extends from the aboveground pumping apparatus to well pump 12, which is installed in the tubing in the vicinity of the oil level. Pump 12 has the usual standing valve 16 and travelling valve 14. Annulus 31 between the pump rod 17 and the production tubing 13, is the channel through which the oil is pumped by the pump. From this annulus, the oil leaves the well through a conduit 55 which is the lead line conveying oil from the well head to a tank battery. In this case, valves 57 and 59 are provided at approximately the positions illustrated. A valve 56 is also provided at approximately the location illustrated.

The apparatus of FIGURE 1 comprises a tubular vessel 19 which is herein termed a surge vessel or chamber. This surge vessel 19 is in one case made from a 7-inch diameter pipe with both ends closed. To one end of pipe 19 is provided a displacement chamber 29 which also has both ends closed. As illustrated in FIGURE 1, one end of the displacement chamber and one end of the surge vessel 19 have a common closure. A support member 21 and a short length of conduit or pipe 27 provide supports for the surge and displacement chamber.

A conduit 35 communicates with the annulus 33 for passage of production gas from the annulus 33 to the displacement chamber and to the surge vessel. Conduit 35 is provided with a valve 34 and a check valve 36 positioned to allow flow of gas from the annulus. To the end of pipe 35 is connected a pipe 32 which leads to the surge vessel 19. At an intermediate point of pipe 32, a branch pipe 43 is provided leading to the displacement chamber. This pipe 32 is provided with a valve 37 and with check valves 39 and 41. Pipe 43 communicates with pipe 32 at a location between the check valves 39 and 41. A pipe 38 is provided for leading gas from an extraneous source, through a pressure regulator 40, a check valve 42, and a manually operable valve 44 to pipe 32. A pipe 23 connects the displacement chamber 29 through valve 25 to the conduit 55 at a position upstream of check valve 58 between valves 56 and 57. Chamber 29 is also provided with a pipe 47 to which is attached a pressure gauge 49. A valve 45 is provided in pipe 47 in case removal of the pressure gauge is necessary. Valves 51 and 53 are provided at positions illustrated in case it is ever desired to check on the level of the liquid in the surge chamber 19. A check valve 58 is provided between manually operable valve 57 and the point of connection of pipe 55 with pipe 27 so that liquid from the surge chamber and from the main portion of the lead line cannot flow backwards into the production tubing on the downstroke of the pump rod.

In FIGURE 2, well tubing 11, production casing 13, annulus 33 and pump rod 17 are the same as corresponding parts in FIGURE 1. Pipe 61 leads gas from an extraneous source (not shown) through a pressure regulator 63, manually operable valve 65, and check valve 67 to conduit 79. Conduit 69 connects annulus 33 through manually operable valve 71 and check valve 75 with conduit 79 and forms a junction with conduit 61. Conduit 79 leads to conduit 81 which is connected into annulus 31. A manually operable valve 83 is positioned at the end of conduit 81, for drainage purposes.

Conduit 85 is operably connected to the annulus 31 of tubing 13 and is the lead line for well fluid pumped to a tank battery (not shown). Manually operable valve 89 and check valve 87 are located in conduit 85, which has a short vertical portion directly under surge vessel 97 and proceeds thence horizontally to the tank battery. Conduit 77 is an upward extension of the vertical portion of conduit 85 and connects with surge vessel 97 as shown in FIGURE 2. Valve 109 is shown in the vertical portion of conduit 85 but may be located nearer to the tank battery if desired.

Conduit 91 connects to conduit 79 and continues through check valve 93 and manually operable valve 95 to connect to the upper portion of surge vessel 97. Pressure gauge 99 is provided to indicate pressure within surge vessel 97. Valved test connections 101, 103 and 105 are provided in the lower portion of the surge vessel for checking liquid level in this vessel.

In the operation of the apparatus illustrated in FIGURE 1 upon actuation of the pump rod 17, the reciprocating pump elevates the well liquid which can be oil and/or water up the production tubing 13. This liquid enters the lead line 55 for passage to a tank battery, not shown. Upon the upstroke of the pump rod, the pressure of the oil in the lead line 55 is quite high as mentioned hereinbefore. On the downstroke of the pump rod, pressure in such a lead line has been observed as being slightly less than atmospheric. For example, the pressure in the lead line adjacent the well production tubing has been observed as being a number of inches of mercury below atmospheric. Thus, it will be seen that with the use of cement lined pipe as mentioned hereinbefore, when pressure surges vary from 250 p.s.i.g. to a few inches of mercury vacuum below atmospheric pressure, there is displacement of liquid in the cracks in the cement. Since check valves 41 and 58 act as back pressure valves for surge vessel 19, on the downstroke of the pump rod pressure is low in the lead line 55 on the upstream side of check valve 58 and liquid from the surge vessel 19 flows through pipe 27 into the lead line. At the same time, when the pressure in displacement chamber 29 becomes less than the gas pressure in conduit 32, gas flows through check valve 39 into the displacement chamber. Then, when the pump rod rises on the pumping stroke, liquid from lead line 55 passes upward through pipe 23 into chamber 29 forcing gas from the chamber through check valve 41 into the surge chamber 19. Also, on the pumping stroke liquid flows through pipe 27 into the surge vessel. However, in one case, when such a surge vessel was employed with the vessel filled with oil at the beginning of the operation so as to exclude air from the system, it was noted that the surge vessel became substantially full of gas in about 1 hour of pumping operation. In this particular instance, the pump rod reciprocated at a rate of 18½ reciprocations per minute with a 108 inch stroke and the gas in conduit 32 was under a pressure of approximately 1 pound per square inch. Whenever gas pressure in the displacement chamber is less than the pressure in conduit 32, gas passes into this chamber. Gas cannot back flow because of the check valves. In the above-mentioned instance, the surge vessel 19 was made of 7-inch diameter pipe, approximately 10 feet in length and the displacement chamber was merely an extension of the 7-inch diameter pipe and was approximately 4-inches in length. The volume of the displacement chamber was slightly over ½ gallon. This small volume of gas, which is readily available to the surge vessel upon pressure stroke of the pump by way of check valve 41, provides for the relatively rapid filling of the surge vessel with gas upon starting up of the operation when the surge vessel is full of liquid. Gas is required to be continuously added to the surge vessel because of the pressure maintained therein. As is known, gas is soluble in liquids under pressure and the higher the pressure, the greater is the solubility of gas in the liquid. In the instance mentioned, there was little to no dissolved gas in the oil well liquid as produced and the gas which was added by way of check valves 39 and 41 to the surge vessel slowly dissolves in the liquid under the pressure maintained in the lead line 55. But the approximately ½ gallon volume of the displacement chamber provided sufficient gas for passage through check valve 41 into the surge vessel to maintain same substantially full of gas at the lowest pressure of the pressure cycle.

The gas provided for use in the surge vessel can come from gas separated from the oil in the well under which conditions the gas is present in the annulus 33. Conduit 35 is provided for the express purpose of passage of gas from the annulus in the well to conduit 32 for addition to the displacement chamber and to the surge vessel. However, in some instances, there is not sufficient gas in the annulus for operation of this apparatus. Under this condition, gas from an extraneous source is passed from a source (not shown) through conduit 38 through a pressure regulator 40 and through the check valve 42 and manually operable valve 44. The pressure regulator in this case can be set at approximately 1 pound per square inch and at this pressure sufficient gas is provided to fill the surge vessel and to replace that dissolved by the oil.

The apparatus of FIGURE 2 operates in substantially the same manner as just described relative to the apparatus in FIGURE 1. However, there obviously is some difference because of the difference in the construction of the surge vessel and because of the absence of the displacement chamber as a separate part from the surge vessel.

The simplest mode of operation for FIGURE 2 is used when valve 95 is closed and gas flows from an extraneous source through pipe 61 or from the well itself through annulus 33 and conduit 69, through conduit 79 and conduit 81 into annulus 31. Although the gas is under only a low pressure it is able to flow into annulus 31 at the moment when pump rod 17 reverses its travel and begins to move downward. At this moment, pressure within annulus 31 falls from a considerable positive pressure to a slight vacuum. Thus, the low gas pressure existing within conduit 81 causes a small amount of gas to flow into annulus 31 during each complete stroke of pump rod 17. The gas added thereby passes with the produced liquid through conduit 85. A portion of the gas dissolves in the produced liquid in conduit 85 due to the pressure existing therein. Some of the gas, however, remains as relatively large bubbles and flows with the produced liquid. Said bubbles tend to separate from the liquid at the T connection between the horizontal portion of conduit 85 and vertical conduit 77. When the bubbles rise they become trapped in surge vessel 97 and cushion the pressure surges caused by the intermittent discharge of the reciprocating pump, at the bottom of the well. Cushioning is obtained by inflow of liquid through conduit 77 into surge vessel 97 during the period of rising pressure in conduit 85. Gas trapped in surge vessel 97 is compressed and subsequently expands to a lower pressure when pressure in conduit 85 falls as the reciprocating pump completes its discharge stroke.

Another mode of operation for FIGURE 2 uses valve 95 in the open position. Low pressure gas flows through conduit 61 or through conduit 69 into conduit 79 and the portion of conduit 91 upstream of check valve 93 during the period when pressure in annulus 31 is a slight vacuum. On the next upstroke of the reciprocating pump operated by pump rod 17, oil pressure in conduit 81 forces a small quantity of gas through check valve 93 into conduit 91, whence the gas flows into the upper portion of surge vessel 97 near the end of the intake stroke of pump 12 when surge vessel pressure is low. Continued addition of gas through conduit 91 with each stroke of the pump soon fills surge vessel 97 and maintains it full, even though some gas is continuously being dissolved in the produced fluid present in surge vessel 97. Of course, surge vessel 97 can be supplied with gas before pumping is initiated.

When purchased gas is being supplied through conduit 61, the amount so purchased is kept to a minimum by restricting gas flow by means of manually operated valve 65. Testing for a sufficient amount of gas in surge vessel for best operation is accomplished by opening valves in test connections 101, 103 and 105. Gauge 99 continuously indicates the varying pressure within surge vessel 97. By showing a smaller difference between minimum pressure and maximum pressure in the surge vessel when sufficient gas is present therein the utility of the invention is clearly demonstrated. When no gas or an insufficient amount is present, the difference between minimum and maximum pressures is greatly increased.

In FIGURE 2 when valve 95 is open, the displacement chamber comprises conduits 61 (or 69), 79, 81 and the section of conduit 91 upstream of check valve 93. When valve 95 is closed, the displacement chamber is in the upper end of well conduit or tubing 13 (annulus 31).

As a specific example, an apparatus similar to that illustrated in FIGURE 1 of the drawing was constructed from approximately a 10-foot section of 7-inch diameter pipe with both ends closed. The displacement chamber 29 was an extension of this pipe of about 4 inches in length. As mentioned above, the volume of this displacement chamber was approximately ½ gallon. Gas was supplied from the annulus 33 through a conduit corresponding to conduit 35 (FIGURE 1) at a pressure of approximately 1 pound per square inch. Without the use of this pressure surge vessel apparatus, pressure surges in conduit 55 varied from 250 pounds per square inch gauge to a minimum of a few inches of mercury vacuum. When using this surge vessel, the maximum pressure in the lead line was 60 p.s.i.g., and the minimum pressure was 55 p.s.i.g. Thus, the maximum spread of pressures in the lead line was reduced from 250 pounds maximum with a minimum of a few inches of mercury vacuum to a maximum pressure of 60 and a minimum pressure of 55 p.s.i.g. Thus, in this manner, the pressure fluctuations were very markedly reduced and cement lined, thin wall pipe was used for several months with substantially no cement cracking and no inner pipe corrosion. In this case, the oil was pumped through a 3-inch diameter lead line which was 3,000 feet long at the rate of 1300 barrels per day. The pump was a 2½ inch pump run at 18½ strokes per minute with a 108 inch stroke.

With the use of the pressure surge chambers of this invention, corrosion behind cracks in the cement lining was reduced or eliminated. Also, since maximum pressures were markedly lower than without the use of the surge vessel, thin wall cement lined pipe could be used instead of lined or unlined thick wall pipe. Present lead lines could carry larger volumns of fluid because upon the downstroke of the pump rod, the compressed gas in the surge vessel forces the liquid through conduit 55 or through conduit 85, to the tank battery. In the case of a new installation, because of this pumping effect by the compressed gas in the surge vessel, smaller diameter lead line pipes can be used, thus decreasing the expense of the overall equipment. Also, since manually operable valve 25 in conduit 23 was maintained open, upon the upstroke of the pump rod this pipe carried liquid to the displacement chamber which assisted in compressing the gas therein for final passage through conduit 43 and check valve 41 to the surge vessel. During the downstroke of the pump rod, since check valve 58 prevents backflow of liquid from downstream parts of the flow line and from the surge vessel, and check valve 41 prevents back flow of gas, the pressure reduction in the displacement chamber allows inflow of gas through check valve 39 for passage to the surge chamber during the next upstroke of the pump.

While the amount or volume of gas used in this operation was not large, provision was made by the use of conduit 35 for gas separated from the oil and present in the annulus 33. For keeping the surge chamber 19 full of gas for this surge operation, only approximately 200 cubic feet of gas per day were required. When pumping a dozen or two wells such as the one herein disclosed and when employing, for example, the 200 cubic feet of gas per day for each of the surge chambers, this gas becomes available for separation at the tank battery and for use as required at that location. For example, if 24 wells were produced into a single tank battery, then 24 times 200 would be 4,800 cubic feet of gas per day available for use at the battery.

Valved pipes 60 are for relief of pressures in annulus 33 when and if necessary. Other sizes of surge chambers can be used than the 10 foot by 7 inch chamber mentioned. One small chamber used was a 5 foot section of 3 inch pipe. This small chamber reduced the pressure surges to about 40 p.s.i. while the 10 foot by 7 inch chamber reduced the surges to about 5 p.s.i.

An arrangement of apparatus similar to that of FIGURE 2 was installed on a number of wells in the Burbank, Oklahoma field. Surge vessel 97 was made by capping the ends of a 4 foot long section of 7 inch casing. Lines 61, 69, 79, 81 and 91 were fabricated from ¼ inch copper tubing and ½ inch check valves were used. Lines 85 and 777 were 2 inch or larger pipe. Actually, line 77 was only a few inches in length, made by connecting the T at the juncture of lines 77 and 85 directly with a nipple on the botom opening in vessel 97.

The apparaus was tested on a well producing approximately 1300 barrels of fluid per day through an individual 3 inch lead line 3000 feet long. A 2½ inch pump operated at 18.5 strokes per minute with a 108 inch stroke. Normal lead line pressure at the well ranged from a vacuum to 250 p.s.i. during each pump stroke. Static lead line pressure was 45 p.s.i.

Conclusions drawn from the tests are set forth below.

*Conclusions*

(1) The surge chamber is very effective in reducing lead line pressure surges. Without the surge chamber, the pressure in the lead line for a test well was 250 p.s.i. maximum and vacuum minimum. With the surge chamber, the lead line pressure was 60 p.s.i. maximum and 55 p.s.i. minimum.

(2) Gas required for continuous operation of the surge chamber was regulated to a minimum of 200 standard cubic feet per day for continuous operation.

(3) The pressure of the supply gas is not critical. With gas supplied from the well annulus, this device pulled 9 inches of vacuum on the annulus, because not enough gas was available from the annulus for continuous operation.

(4) Gas injectel directly into the lead line at the pumping T separated from produced fluid and entered the surge chamber. This allows a simpler piping arrangement.

(5) Use of the surge vessel is approximately 10 times more effective in reducing pressure surges than injecting gas directly into the lead line with no surge vessel. Direct gas injection also uses three times the volume of gas used in the surge vessel.

(6) This surge vessel device is easy to build and install in the field. It does not interfere with normal well operation, testing or well service.

(7) Total cost of the surge vessel installed on a SBU (South Burbank Unit) well is estimated to be $75.00 or less, depending on the vessel size and piping arrangement used.

(8) After the minimum gas feed rate is set, no further maintenance should be required. After 3 months operation the ½ inch check valves showed no wear. This is the only moving part of the device.

(9) The permanent pressure gauge on the surge chamber continuously indicates the magnitude of pressure surges in the lead line. On single well lead lines this gauge also shows if the well is producing fluid or not.

The operation of invention requires injection of gas into the surge vessel to maintain a reasonable surge volume of at least about ½ the volume of fluid pumped on each stroke. Gas from the surge vessel is absorbed by or goes into solution in the lead line liquid and must be replaced as this occurs. The injection of gas into the surge vessel is accomplished by utilizing the pressure differences which occur in the lead line at the well head, upstream of the lead line check valve. The gas can be injected directly into the surge vessel or it can be injected into the lead line at the well head (pumping T) and allowed to break out of the produced fluid to rise into the surge vessel.

When a beam pumping well has lead line pressure surges, the line pressure at the pumping T will drop to a vacuum during a small part of the pump down-stroke. This vacuum allows gas to pass through a check valve from a source of low pressure gas and into the line connected to the pumping T. During the up-stroke of the pump, the pressure at the pumping T increases because fluid is being discharged into the lead line. The pressure at the pumping T, and on the gas trapped by the check valve in the gas line is then slightly higher than the pressure in the surge chamber. The pressure difference is largely due to the drop across the lead line check valve. The pressure difference causes the gas to flow through a second check valve and line and into the surge chamber. The same procedure occurs on each pump stroke. If the valves on the gas lines are full open, the volume of gas injected into the surge chamber will approach 1,000 cubic feet per day. These valves must be partially closed to regulate the volume of gas used.

The lead line check valve located up-stream from the surge chamber is necessary for the operation of the gas pumping system. The surge chamber reduces both the high and low pressure surges in the lead line down-stream from the lead line check valve. It also reduces the high pressure surges in the lead line and tubing up-stream from the lead line check valve, but it does not change the low pressure surges up-stream from this check valve, because of the closing of the check valve.

The only moving parts used with the surge chamber device are the flappers of ½ inch Charles Wheatley Stream Flow Check Valves. These open and close once during each pump stroke to supply gas to the surge chamber. After three months of continuous operation, the check valves were dismantled and inspected. The flapper pivot bearings, the O-ring seal and the seat were in good operation condition.

Surge chamber tanks of various volumes were tested. The largest was 10 feet of 7-inch casing, and the smallest was 5 feet of 3-inch line pipe. Effectiveness in reducing surges was found to be proportional to surge chamber volume. The largest chamber reduced the pressure surges to 5 p.s.i. and the smallest chamber reduced the pressure surges to 40 p.s.i. The surge pressure with any volume surge chamber of this design can be approximated by using Boyles Law, $P_1V_1 = P_2V_2$, and assuming that half of the fluid volume delivered on one pump stroke will enter the surge chamber to compress the gas from minimum line pressure to maximum line pressure. The best sized surge chamber for wells similar to those on test appears to be 7-inch diameter and 3 to 4 feet long. This size is easy to handle and it reduces surge pressures or pressure change to about 15 p.s.i. where static pressure is 45 p.s.i.

The minimum amount of gas required by the surge chamber was determined through the use of a residential type gas meter. The volume of gas used was regulated by adjustment of a ½-inch needle valve and a pressure regulator on the gas supply line. When too small a volume of gas was fed to the surge chamber, it gradually filled with liquid. The minimum amount of gas required to keep the surge chamber full varied from 88 to 210 standard cubic feet per day. At 200 cubic feet per day, the cost of using fuel gas would be 4¢ a day.

Supply gas pressure can be less than 1 p.s.i. In one test the well, the casing-tubing annulus was used as a source of gas for the surge chamber. The gas pumping action reduced the pressure in the annulus to 9-inches of vacuum in two days. In some wells all of the gas required for a surge chamber can be obtained from the annulus, but in this case not enough casing gas was available for continuous operation of the surge chamber.

A gas line directly to the surge chamber was not necessary. When the gas was injected into the produced fluid at the pumping T, only a small part of it dissolved in the fluid in the 10 to 15 feet of lead line it traveled through before it reached the surge chamber. Nearly all of the gas injected separated from the produced fluid and entered the surge chamber.

When the gas supply to the surge chamber was shut off completely, all of the gas in the chamber was absorbed by the well fluid. The chamber filled with liquid in two days.

Gas was injected directly into the lead line with no surge chamber to determine if the lead line itself would act as an effective surge chamber. With gas going into the lead line at a rate of 600 cubic feet per day, the line pressure surged from 25 to 100 p.s.i. Thus, the chamber gives much more economical and efficient reduction of surges.

While certain embodiments of the invention have been described for illustrative purposes, the invention obviously is not limited thereto.

I claim:

1. Apparatus for absorbing pressure surges in a lead line transporting liquid from a well comprising in combination, adjacent the well head:

(1) a well conduit having a downhole single action reciprocating pump on the lower end thereof, said pump having an intake on its lower end for formation liquid;

(2) a lead line for liquid connected with the upper end of said well conduit having a check valve therein adjacent said well conduit;

(3) a surge vessel connected by conduit with said lead line upstream of the delivery end thereof and downstream of said check valve having an inlet for gas therein;
(4) a gas displacement chamber communicating with said inlet and with the upper end of said well conduit;
(5) means for preventing back flow of fluid from said surge vessel thru said displacement chamber; and
(6) a gas supply line connected with said displacement chamber having a check valve therein to prevent back flow from said chamber.

2. The apparatus of claim 1 wherein the displacement chamber of (4) is connected with the lead line of (2) upstream of the check valve therein and the inlet of (3) is in an upper section of the surge vessel.

3. The apparatus of claim 1 wherein oil containing normally gaseous hydrocarbons in solution is being pumped and the displacement chamber of (4) is formed of tubing connecting the upper end of the well conduit of (1) with the inlet of (3), said inlet being in an upper section of said vessel.

4. The apparatus of claim 1 wherein the displacement chamber of (4) is in the upper end of the well conduit of (1); the inlet of (3) is thru the connecting conduit with the lead line, said connecting conduit and said lead line upstream thereof providing communication between said displacement chamber and said surge vessel.

5. The apparatus of claim 1 wherein said gas supply line connects by conduit means with an annulus of said well surrounding said well conduit and the liquid being pumped is oil containing absorbed gaseous hydrocarbons.

6. Apparatus for absorbing pressure surges in a lead line transporting liquid from a well, comprising in combination, adjacent the well head:
(1) a well tubing having a downhole single action reciprocating pump on its lower end, said pump having an intake on its lower end for formation liquid;
(2) a lead line for liquid connected with the upper end of said well tubing having a check valve therein;
(3) a surge vessel having means for ingress and egress of fluids communicating with said lead line downstream of said check valve and upstream of its delivery end;
(4) a gas displacement chamber communicating with the upper end of said tubing;
(5) conduit means communicating between the chamber of (4) and the vessel of (3);
(6) means in the conduit means of (5) for preventing backflow of gas from the vessel of (3) to the chamber of (4); and
(7) a gas supply line communicating with the chamber of (3) having a check valve therein preventing backflow from said chamber.

7. Apparatus for absorbing pressure surges in a lead line transporting liquid from a well, comprising in combination, adjacent the well head:
(1) a well tubing having a downhole single action reciprocating pump on its lower end, said pump having an intake on its lower end for formation liquid;
(2) a lead line for liquid connected with the upper end of said well tubing having a check valve therein;
(3) a surge vessel having means for ingress and egress of fluids and communicating with said lead line downstream of said check valve and upstream of its delivery end;
(4) a gas supply line communicating a source of gas with the upper end of said tubing having a check valve therein preventing backflow from said tubing.

8. The apparatus of claim 7 including a separate conduit connecting an upper section of the vessel of (3) with said gas supply line downstream of the check valve therein; a cut-off valve in said separate conduit; and a check valve in said separate conduit preventing backflow from said vessel.

9. A pressure surge absorbing assembly for a flow line transporting liquid from a well employing a downhole reciprocating pump comprising in combination, adjacent the well head:
(a) a production line for liquid, free of pump means, leading from a production tubing of said well having a first check valve therein to prevent flow from downstream thereof back to said tubing;
(b) a surge chamber having an outlet in its lower section connected with said production line upstream of its delivery end and downstream of said first check valve by an unobstructed conduit;
(c) a gas supply line leading into said surge chamber having spaced apart second and third check valves therein preventing backflow from said surge chamber; and
(d) a displacement chamber connected with said production line upstream of said first check valve by an open first conduit and with said gas supply line intermediate said second and third check valves by an open second conduit.

10. A pressure surge absorbing assembly for a flow line transporting liquid from a well employing a downhole reciprocating pump comprising in combination, adjacent the well head:
(a) a production line, free of pump means, leading from a production tubing of a well;
(b) a surge chamber;
(c) a fluid displacement chamber;
(d) a gas supply line communicating with elements (b) and (c);
(e) means in the line of (a) for preventing flow of fluid therein toward said tubing;
(f) means in the line of (d) for preventing backflow of fluid therethru from elements (b) and (c);
(g) conduit means providing open communication between the chamber of (c) and a point in the line of (a) upstream of means (e); and
(h) conduit means providing open communication between the chamber of (b) and a point in the line of (a) downstream of means (e) and upstream of its delivery end.

11. A pressure surge absorbing assembly for a flow line transporting liquid from a well employing a reciprocating pump in said well comprising in combination,
(a) a producing line, free of pump means, leading from a production tubing of said well having a first check valve therein to prevent flow from downstream thereof back to said tubing;
(b) a casing having a first compartment and a second compartment, said second compartment comprising a surge chamber having an outlet in its lower section connected with said production line downstream of said first check valve by an unobstructed conduit;
(c) a gas supply line leading into said surge chamber having spaced apart second and third check valves therein preventing backflow from said surge chamber; and
(d) said first compartment comprising a displacement chamber connected with said production line upstream of said first check valve by an open first conduit and with said gas supply line intermediate said second and third check valves by an open second conduit.

12. In the assembly of claim 11, said well having a casing surrounding said tubing thereby providing an annulus therebetween, said annulus being filled with production gas under at least a slight superatmospheric pressure, and the gas supply line of (c) being connected with said annulus.

13. In the assembly of claim 11, wherein said source of gas is an extraneous source of gas.

14. A process for reducing pressure surges in a lead line from a well conduit in a well developed by a downhole single acting reciprocating pump, which comprises the steps of:

(1) maintaining a surge zone containing a substantial volume of gas and communicating with said lead line adjacent said well;
(2) reciprocating said pump so as to force well fluid thru said lead line and develop fluid pressure in said line which increases on the pumping stroke and compresses the gas in said surge zone;
(3) preventing back flow of well fluid in said lead line at a selected point therein adjacent said well conduit on the intake stroke of said pump;
(4) during said intake stroke, applying the force of the compressed gas in the surge zone of step (2) on the fluid in said lead line downstream of said selected point, thereby losing a portion of said gas into said lead line;
(5) creating a zone of partial vacuum in the well fluid upstream of said selected point and in the upper end of said well conduit for a moment early in said intake stroke;
(6) for a moment early in said pumping stroke, creating a higher pressure in said lead line than in said surge zone;
(7) maintaining a gas displacement zone communicating with said zone of partial vacuum and with said surge zone;
(8) preventing flow of gas from said surge zone to said displacement zone;
(9) utilizing said partial vacuum to draw gas from a gas source into said displacement zone on each intake stroke; and
(10) utilizing the pressure differential created early in said pumping stroke to force gas from said displacement zone into said surge zone to replace lost gas.

15. The process of claim 14 wherein said gas source is gas in a well annulus outside of said well conduit.

16. The process of claim 15 wherein said gas source is a source of hydrocarbon gas outside of the well.

References Cited by the Examiner

UNITED STATES PATENTS

| | | | |
|---|---|---|---|
| 57,412 | 8/66 | Van der Weyde | 103—224 |
| 227,698 | 5/80 | McMurray | 103—6 |
| 1,760,849 | 5/30 | Pomeroy | 103—9 |
| 1,937,149 | 11/33 | Holveck | 103—223 |

LAURENCE V. EFNER, *Primary Examiner.*

ROBERT M. WALKER, *Examiner.*